US011017461B2

(12) United States Patent
Almog et al.

(10) Patent No.: US 11,017,461 B2
(45) Date of Patent: May 25, 2021

(54) SYSTEMS AND METHODS FOR DISPLAYING A PERSONALIZED OUTFIT

(71) Applicant: BONOBOS, INC., New York, NY (US)

(72) Inventors: Hilah Sarah Almog, New York, NY (US); Richard Eduardo Nuno, Harrison, NJ (US); Thiam Hui Lee, New York, NY (US); Howard Fisher Cordray, III, Long Island City, NY (US); Phillip Chase Birtcher, Brooklyn, NY (US); Steven Diaz, New York, NY (US); Scott Michael Crawford, New York, NY (US); Nelson Obiora Madubuonwu, New York, NY (US); Jason Timothy Dolatshahi, New York, NY (US)

(73) Assignee: BONOBOS, INC., New York, NY (US)

( * ) Notice: Subject to any disclaimer, the term of this patent is extended or adjusted under 35 U.S.C. 154(b) by 466 days.

(21) Appl. No.: 15/803,542

(22) Filed: Nov. 3, 2017

(65) Prior Publication Data

US 2019/0139129 A1 May 9, 2019

(51) Int. Cl.
*G06Q 30/06* (2012.01)
*G06F 16/22* (2019.01)
(Continued)

(52) U.S. Cl.
CPC ..... *G06Q 30/0643* (2013.01); *G06F 16/2264* (2019.01); *G06F 17/16* (2013.01); *G06F 3/0482* (2013.01); *G06F 3/0484* (2013.01)

(58) Field of Classification Search
CPC ..... G06Q 30/06; G06Q 30/0601–0643; G06Q 30/08; G06F 3/0482; G06F 3/0484;
(Continued)

(56) References Cited

U.S. PATENT DOCUMENTS

| 7,089,216 B2 | 8/2006 | Van Overveld |
| 2010/0191770 A1 | 7/2010 | Cho et al. |

(Continued)

OTHER PUBLICATIONS

7 Popular Wardrobe and Outfit Planning Apps Reviewed. By Imogen. Mar. 24, 2016. (Year: 2016).*

(Continued)

*Primary Examiner* — William J Allen
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of coordinating displaying a set of dress code interface elements, coordinating displaying each weather condition interface element of the set of weather condition interface elements associated with a different weather condition of a set of weather conditions, receiving a dress code selection of a first dress code interface element of the set of dress code interface elements, receiving a weather condition selection of a first weather condition interface element of the set of weather condition interface elements, and coordinating displaying a first outfit comprising multiple layers. The one item for each layer of the multiple layers can be based on one or more item affinity scores for the user and one or more color rules.

20 Claims, 10 Drawing Sheets

(51) Int. Cl.
  *G06F 17/16* (2006.01)
  *G06F 3/0482* (2013.01)
  *G06F 3/0484* (2013.01)

(58) Field of Classification Search
  CPC ...... G06F 16/00; G06F 16/22; G06F 16/2228; G06F 16/2264; G06F 16/23; G06F 17/10; G06F 17/12; G06F 17/16
  See application file for complete search history.

(56) References Cited

U.S. PATENT DOCUMENTS

| | | | | |
|---|---|---|---|---|
| 2012/0316955 | A1* | 12/2012 | Panguluri | G06Q 30/02 705/14.41 |
| 2014/0025533 | A1 | 1/2014 | Lv | |
| 2014/0114884 | A1* | 4/2014 | Daway | G06Q 90/00 706/11 |
| 2014/0279186 | A1 | 9/2014 | Juan et al. | |
| 2014/0310304 | A1 | 10/2014 | Bhardwaj et al. | |
| 2014/0379426 | A1 | 12/2014 | Guo et al. | |
| 2015/0170250 | A1 | 6/2015 | Dalal et al. | |
| 2015/0262282 | A1* | 9/2015 | Walti | G06Q 30/0643 705/26.7 |
| 2016/0026926 | A1 | 1/2016 | Yeung et al. | |
| 2016/0140491 | A1* | 5/2016 | Forgatch | G06Q 10/087 705/7.29 |
| 2016/0321547 | A1* | 11/2016 | Johnson | G06Q 10/087 |
| 2017/0076011 | A1* | 3/2017 | Gannon | G06Q 30/0633 |
| 2018/0075516 | A1* | 3/2018 | Barkan | G06F 16/00 |
| 2018/0096410 | A1* | 4/2018 | Zhao | G06Q 30/0631 |

OTHER PUBLICATIONS

Tunes Preview of Closet+ by My Static Self Ltd., retrieved from https://itunes.apple.com/au/app/closet+/id309532414?mt=8 Oct. 4, 2017.
Tunes Preview of Closet Space—Fashion Inspiration, Virtual Closet, & Outfit Planner by Sylitics, Inc., retrieved from https://itunes.apple.com/au/app/closetspace-fashion-inspiration/od549724282?mt=8 Oct. 4, 2017.
Closfy—Your virtual closet, retrieved from https://play.google.com/store/apps/details?id=com.agba.closfy&hl=en Oct. 4, 2017.
Tunes Preview of Combat Gent—Suits, Shirts, Ties & More by Compatant Gentlemen, Inc., retrieved from https://itunes.apple.com/us/app/combat-gent-suits-shirts-ties-more/id1041033316?mt=8 Oct. 4, 2017.
Fernandez, Chantal, "Finery Aims to Succeed Where Other Virtual Closets Have Not," Fashion-Tech, Business of Fashion Mar. 9, 2017.
Suhrawardi, Rebecca, "E-Tailer Moda Operandi Adds Another Layer to Luxury Shopping in the Digital Age," Forbes / Lifestyle / #Cutting Edge May 25, 2017.
My Dressing—Fashion closet, retrieved from https://play.google.com/store/apps/details?id=co.mydressing.app&hl=en Oct. 4, 2017.
ITunes Preview of My Fashion Closet by ModiFace, retrieved from https://itues.apple.com/au/app/my-fashion-closet/id4622788477mt=8 Oct. 4, 2017.
ITunes Preview of My little closet by DOC Developments, retrieved from https://itunes.apple.com/us/app/my-little-closet/id546510199?mt=8 Oct. 4, 2017.
ITunes Preview of Polyvore—Fashion & Style by Polyvore, retrieved from https://itunes.apple.com/us/app/polyvore-fashion-trends-style-shopping/id499978982?mt=8 Oct. 4, 2017.
ITunes Preview of Pureple Outfit Planner by Iceclip, retrieved from https://itunes.apple.com/us/app/pureple-ouffit-planner-closet-organizer-stylist/id628106373?mt=8 Oct. 4, 2017.
The Stylebook Concept, Sylebook Closet App: About Us, retrieved from http://www.stylebookapp.com/about.html Oct. 4, 2017.
ITunes Preview of Stylicious—Closet Organizer, Fashion Lookbook and Style Shopping App by FABU Inc., retrieved from https://itunes.apple.com/us/app/stylicious-my-lookbook-fashion/id776215046?ls=1&mt=8 Oct. 4, 2017.
ITunes Preview of Stylish Girl—Your fashion closet and style stopping app by Loveseat Inc., retrieved from https://itunes.apple.com/au/app/stylish-girl-your fashion/id3016695920?mt=8 Oct. 4, 2017.
ITunes Preview of Wear by Jan Mazurczak, retrieved from https://itunes.apple.com/au/app/wear/id427485702?mt=8 Oct. 4, 2017.
Enthoven, J., Now Image Search Can Jump-Start Your Search for Style, retrieved from https://blog.google/products/search/now-image-search-can-jump-start-your-search-style/ Apr. 13, 2017.

* cited by examiner

400

405 – Receiving at least one of (1) forecasted weather information for a location of a user device of a user, or (2) a weather condition selection of a set of weather conditions from the user device.

410 – Receiving at least one of (1) a default dress code of a set of dress codes for the user, or (2) a dress code selection of the set of dress codes from the user device.

415 – Retrieving a purchase history for the user, the purchase history comprising items purchased by the user from an online retailer.

420 – Accessing an on-line catalogue of items available for purchase from the online retailer.

425 – Determining multiple layers for a first outfit based on at least one of (1) the forecasted weather information or the weather condition selection, and (2) the default dress code or the dress code selection.

430 – Determining one item for each layer of the multiple layers of the first outfit.

435 – Coordinating displaying the first outfit on a user interface of the user device.

FIG. 4

SYSTEMS AND METHODS FOR DISPLAYING A PERSONALIZED OUTFIT

TECHNICAL FIELD

This disclosure relates generally to an electronic application for displaying personalized outfits on an interface of an electronic device.

BACKGROUND

Many customers of both traditional brick and mortar stores and online retailers now prefer the convenience of shopping for clothes online. While shopping for clothes online can be convenient for customers, some aspects of shopping are sacrificed when a customer uses the Internet to shop online. For example, it can be difficult for customers to match clothes in a coordinated fashion when shopping online.

BRIEF DESCRIPTION OF THE DRAWINGS

To facilitate further description of the embodiments, the following drawings are provided in which:

FIG. 4 is a flowchart for a method, according to certain embodiments;

Figure 1:
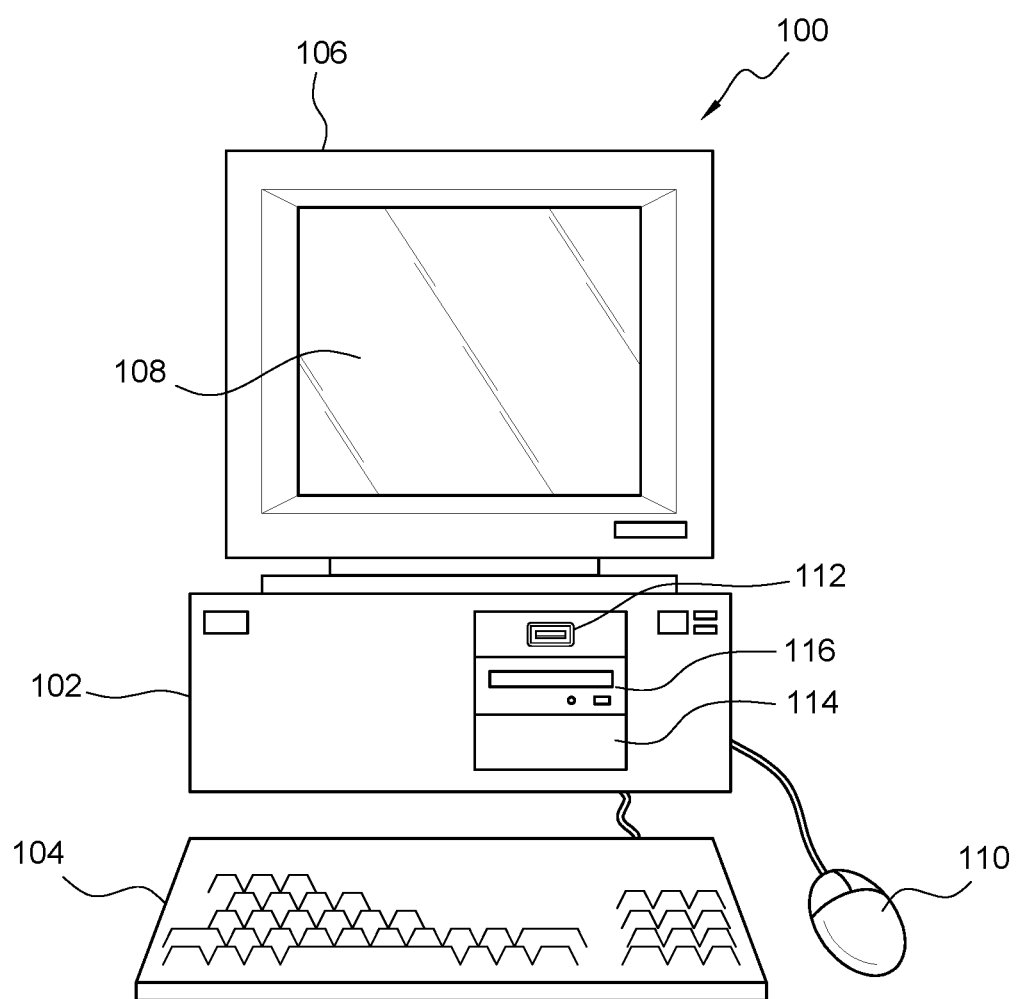
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory storage computer-readable media storing computing instructions configured to run on the one or more processors. The one or more non-transitory storage computer-readable media can be configured to run on the one or more processors and perform an act of receiving at least one of (1) forecasted weather information for a location of a user device of a user, or (2) a weather condition selection of a set of weather conditions from the user device. The one or more non-transitory storage computer-readable media can be further configured to run on the one or more processors and perform an act of receiving at least one of (1) a default dress code of a set of dress codes for the user, or (2) a dress code selection of the set of dress codes from the user device. The one or more non-transitory storage computer-readable media can be further configured to run on the one or more processors and perform an act of retrieving a purchase history for the user. The purchase history can comprise items purchased by the user from an online retailer. The one or more non-transitory storage computer-readable media can be further configured to run on the one or more processors and perform an act of accessing an online catalogue of items available for purchase from the online retailer. The one or more non-transitory storage computer-readable media can be further configured to run on the one or more processors and perform an act of determining multiple layers for a first outfit based on at least one of (1) the forecasted weather information or the weather condition selection, and (2) the default dress code or the dress code selection. The one or more non-transitory storage computer-readable media can be further configured to run on the one or more processors and perform an act of determining one item for each layer of the multiple layers of the first outfit from one of (1) the items purchased by the user from the online retailer, or (2) the online catalogue of items available for purchase from the online retailer. The first outfit can be based on (a) one or more item affinity scores for the user, and (b) one or more color rules configured to match the one item of each layer of the multiple layers with the one item of one or more other layers of the multiple layers. The one or more non-transitory storage computer-readable media can be further configured to run on the one or more processors and perform an act of coordinating displaying the first outfit on a user interface of the user device.

Various embodiments include a method. The method can include receiving at least one of (1) forecasted weather information for a location of a user device of a user, or (2) a weather condition selection of a set of weather conditions from the user device. The method also can include receiving at least one of (1) a default dress code of a set of dress codes for the user, or (2) a dress code selection of the set of dress codes from the user device. The method also can include retrieving a purchase history for the user, the purchase history comprising items purchased by the user from an online retailer. The method also can include accessing an online catalogue of items available for purchase from the online retailer. The method also can include determining multiple layers for a first outfit based on at least one of (1) the forecasted weather information or the weather condition selection, and (2) the default dress code or the dress code selection. The method also can include determining one item for each layer of the multiple layers of the first outfit from one of (1) the items purchased by the user from the online retailer, or (2) the online catalogue of items available for purchase from the online retailer. The first outfit can be based on (a) one or more item affinity scores for the user, and (b) one or more color rules configured to match the one item of each layer of the multiple layers with the one item of one or more other layers of the multiple layers. The method also can include coordinating displaying the first outfit on a user interface of the user device.

A number of embodiments can include a system. The system can include one or more processors and one or more non-transitory storage computer-readable media storing computing instructions configured to run on the one or more processors. The one or more non-transitory storage computer-readable media can be configured to run on the one or more processors and perform an act of transmitting instructions for downloading a mobile application for an online retailer onto a user device. The one or more non-transitory storage computer-readable media can be further configured to run on the one or more processors and perform an act of coordinating displaying, on a user interface of the mobile application on the user device, a set of dress code interface elements. Each dress code interface element of the set of dress code interface elements can be with a different dress code of a set of dress codes. The one or more non-transitory storage computer-readable media can be configured to run on the one or more processors and perform an act of coordinating displaying, on the user interface of the mobile application on the user device, a set of weather condition interface elements. Each weather condition interface element of the set of weather condition interface elements can be associated with a different weather condition of a set of weather conditions. receiving, from the user device, a dress code selection of a first dress code interface element of the set of dress code interface elements. The one or more non-transitory storage computer-readable media can be configured to run on the one or more processors and perform an act of receiving, from the user device, a weather condition selection of a first weather condition interface element of the set of weather condition interface elements. The one or more non-transitory storage computer-readable media can be configured to run on the one or more processors and perform an act of coordinating displaying, on the user interface of the mobile application on the user device, a first outfit comprising multiple layers. The multiple layers for the first outfit can be based on the dress code selection and the weather condition selection. Each layer of the multiple layers of the first outfit can comprise one item from one of (1) any items purchased by the user from the online retailer, or (2) a catalogue of items available for sale from the online retailer. The one item for each layer of the multiple layers is can be based on (a) one or more item affinity scores for the user, and (b) one or more color rules configured to match the one item of each layer of the multiple layers with the one item of other layers of the multiple layers.

Figure 2:
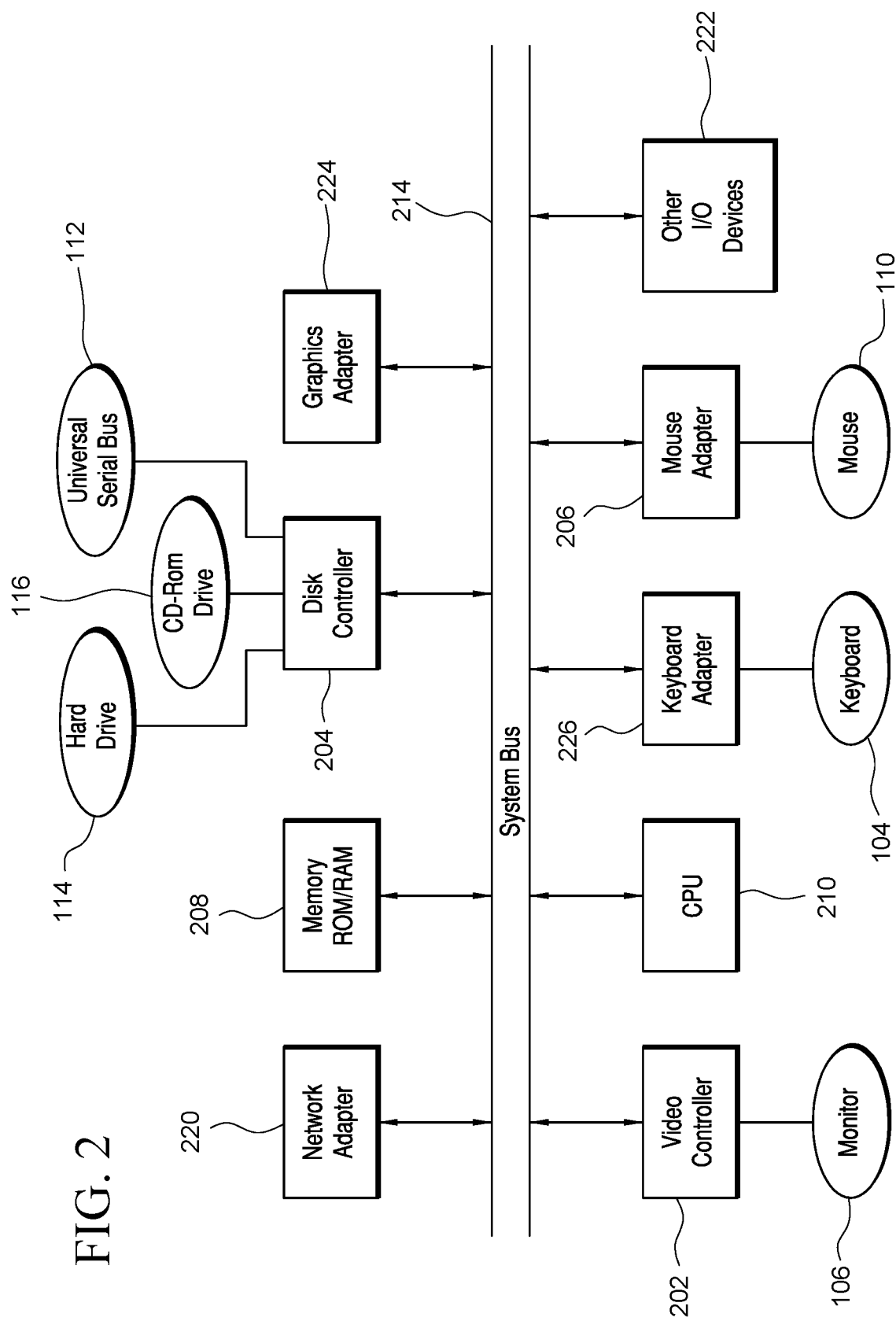
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory.

Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
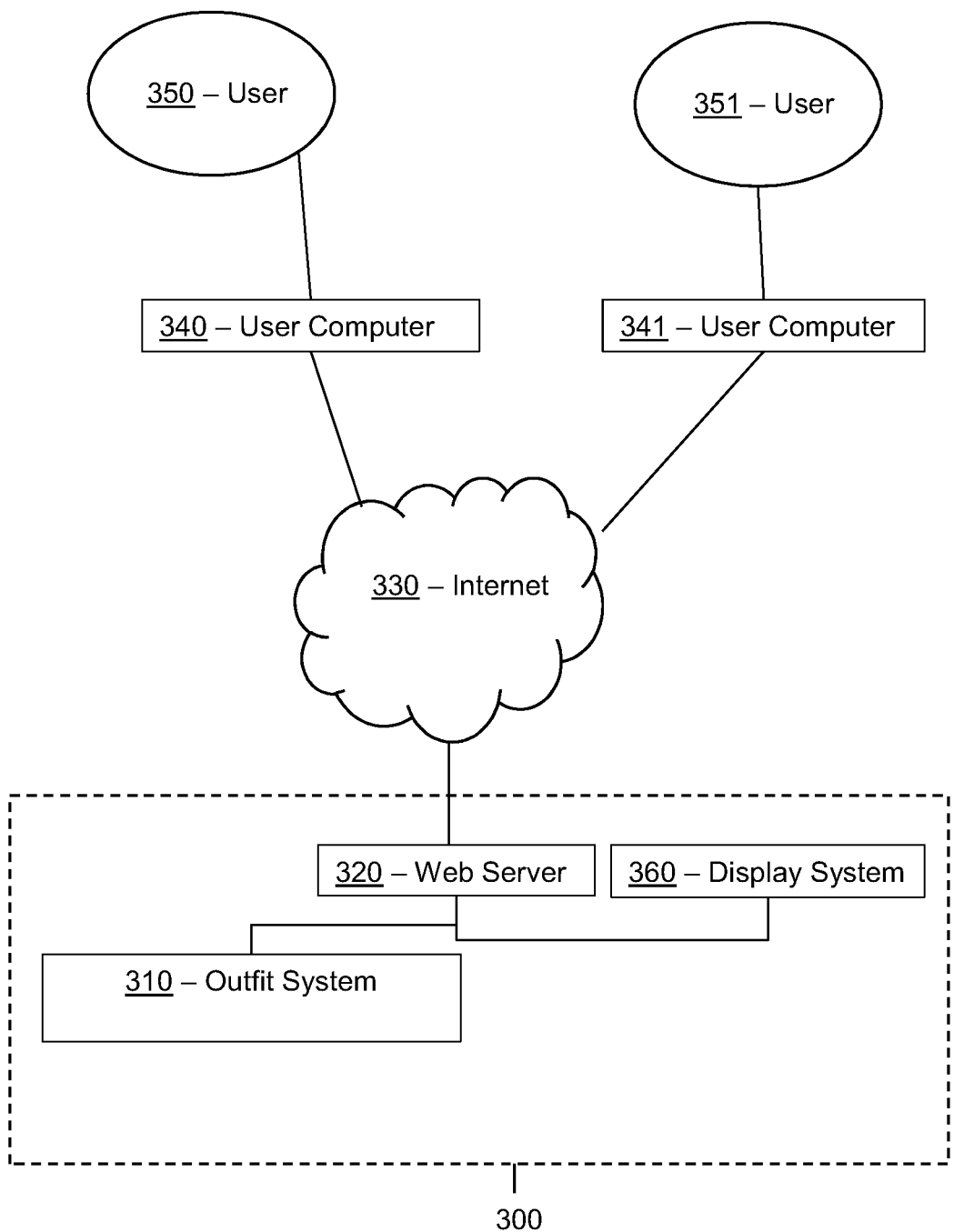
FIG. 3 illustrates a representative block diagram of a system, according to an embodiment.

Turning ahead in the drawings, FIG. 3 illustrates a block diagram of a system 300 that can be employed for displaying a personalized outfit, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an outfit system 310, a web server 320, and a display system 360. Outfit system 310, web server 320, and/or display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of outfit system 310, web server 320, and/or display system 360. Additional details regarding outfit system 310, web server 320, and/or display system 360 are described herein.

In many embodiments, system 300 also can comprise user computers 340, 341. User computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, outfit system 310, web server 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) outfit system 310, web server 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of outfit system 310, web server 320, and/or display system 360. In a similar manner, the processing module(s) and the memory storage module(s) can be local and/or remote to each other.

In many embodiments, outfit system 310, web server 320, and/or display system 360 can be configured to communicate with one or more user computers 340 and 341. In some embodiments, user computers 340 and 341 also can be referred to as customer computers. In some embodiments, outfit system 310, web server 320, and/or display system 360 can communicate or interface (e.g., interact) with one or more customer computers (such as user computers 340 and 341) through a network or internet 330. Internet 330 can be an intranet that is not open to the public. Accordingly, in many embodiments, outfit system 310, web server 320, and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, outfit system 310, web server 320, and/or display system 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between outfit system 310, web server 320, and/or display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
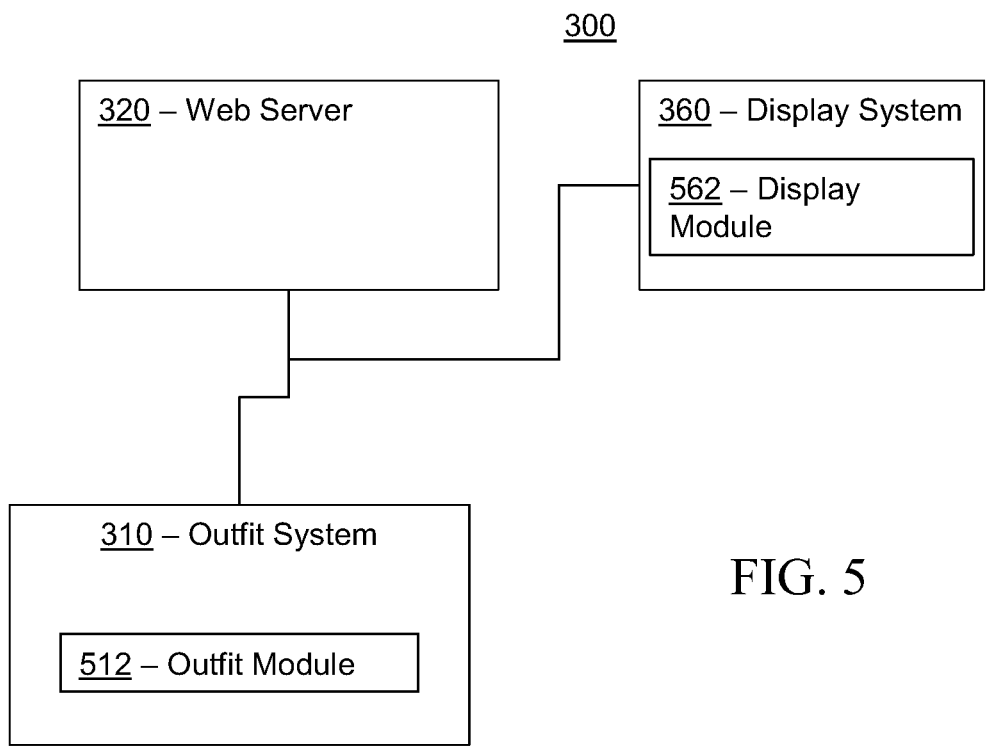
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512 and/or 562 (FIG. 5). Such non-transitory memory storage modules can be part of a computer system such as outfit system 310, web server 320, and/or display system 360 (FIGS. 3 & 5). The processing module(s) can be similar or identical to the processing module(s) described above with respect to computer system 100 (FIG. 1).

Many customers of both traditional brick and mortar stores and online retailers now prefer the convenience of shopping for clothes online. While shopping for clothes online can be convenient for customers, some aspects of shopping are sacrificed when a customer uses the Internet to shop online. For example, it can be difficult for customers to match clothes in a coordinated fashion when shopping online. To solve this Internet-centric problem, various embodiments of method 400 and related systems can identify and then display matching layers of an outfit on a user interface of a user's electronic device. As shall be described in greater detail below, these layers can be dependent on selected dress codes and/or weather conditions forecasted for a location near the electronic device of the user. Furthermore, various embodiments of method 400 and related systems also can incorporate both previously purchased and new clothes into the generation of an outfit comprising multiple layers.

In some embodiments, method 400 can optionally comprise an activity of transmitting instructions for downloading a mobile application for the online retailer onto the user device. The mobile application can comprise a mobile application that is proprietary to the online retailer. The online retailer can comprise a retailer that is exclusively an online retailer, or can comprise a retailer that is associated with both a brick and mortar store and also an online retailer. In many embodiments, the mobile application has access to at least one of (1) the online catalogue for the online retailer and/or (2) the purchase history for the user from the online retailer. The mobile application can be configured to allow the user to purchase items through the mobile application, as well as access items previously purchased from the online retailer by the user. In many embodiments, the mobile application is configured to be downloaded to a mobile user device, such as but not limited to a smartphone, a tablet computer, a smartwatch, and so on. In some embodiments, the mobile application also can be configured to be downloaded to a desktop computer. In still other embodiments, activities of method 400 can be performed on a website for the online retailer, as accessed by a user on either a mobile electronic device or a desktop computer, without requiring the downloading of a mobile application.

Figure 6A:
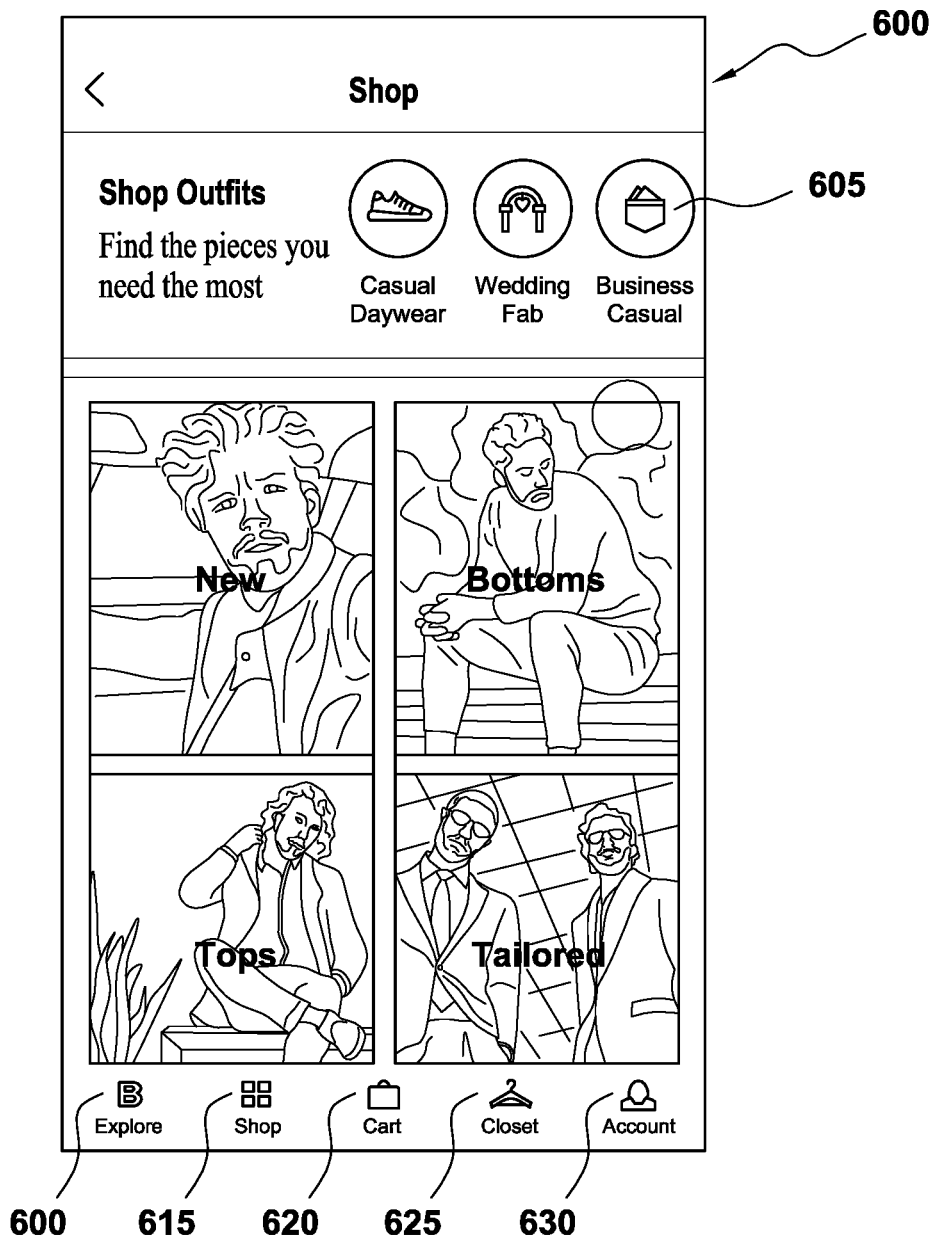
FIGS. 6A-E illustrate views of a user interface, according to embodiments.

In many embodiments, method 400 can allow a user to select a default dress code and/or a dress code override. The default dress code and/or dress code override can be selected from a variety of different dress codes, such as but not limited to a black tie dress code, a business formal dress code, a business casual dress code, a wedding dress code, a casual dress code, a "night on the town" dress code, a work travel dress code, and/or a rest & relaxation dress code. In many embodiments, method 400 can comprise an activity of coordinating displaying, on the user interface of the user device, a set of dress code interface elements. In some embodiments, method 400 can similarly comprise an activity of generating instructions for providing an interface that displays the set of dress code interface elements. Each dress code interface element of the set of dress code interface elements can be associated with a different dress code of the set of dress codes described above. FIGS. 6A and 6D provide non-limiting examples of dress code interface elements displayed on the user interface of a mobile application for an online retailer downloaded to a user mobile device.

In many embodiments, method 400 can allow a user to select a default weather condition and/or a weather condition override. The default weather condition and/or the weather condition override can be selected from a variety of different weather conditions, such as but not limited to hot, warm, cool, cold, wet, dry, and/or sunny. In many embodiments, method 400 can comprise an activity of coordinating displaying, on the user interface of the user device, a set of weather condition interface elements. In some embodiments, method 400 can similarly comprise an activity of generating instructions for providing an interface that displays the set of weather condition interface elements. Each weather condition interface element of the set of weather condition interface elements can be associated with a different weather condition of the set of weather conditions described above. FIG. 6E provides a non-limiting example of a weather condition interface element 675 displayed on the user interface of a mobile application for an online retailer downloaded to a user mobile device.

In addition to or as an alternative to a user-selected weather condition, method 400 also can automatically determine forecasted weather information for a location of a user device. For example, systems 300 (FIG. 3) can request and obtain permission to use location information of a user device. Location information can include but is not limited to global positioning system (GPS) coordinates for the user device, or a location of a router providing wireless Internet to the user device. Once system 300 (FIG. 3) has determined a location of the user device, system 300 can obtain forecasted weather information for the location of the user device, as determined, through any of a number of weather information sources. When the forecasted weather information is determined, method 400 can comprise an activity of selecting a forecasted weather condition of the set of weather conditions described above. For example: if the temperature is forecasted to be below 45 degrees Fahrenheit, the forecasted weather condition of cold can be selected by system 300 (FIG. 3); if the temperature is forecasted to between 45 and 60 degrees Fahrenheit, the forecasted weather condition of cool can be selected by system 300 (FIG. 3); if the temperature is forecasted to be between 60 and 75 degree Fahrenheit, the forecasted weather condition of warm can be selected by system 300 (FIG. 3); and/or if the temperature is forecasted to be greater than 75 degrees Fahrenheit, the forecasted weather condition of hot can be selected by system 300 (FIG. 3). In other embodiments, different predetermined temperature ranges or thresholds can be used for the forecasted weather conditions of cool, warm, hot, and/or cold.

In addition to or as an alternative to a user-selected weather condition and/or an automatically determined weather condition, method 400 also can automatically assign a forecasted weather condition, particularly if location tracking is denied and/or the user has not selected a weather condition. For example: the forecasted weather condition of cold can be automatically assigned by system 300 (FIG. 3) during the months of November through February; the forecasted weather condition of cool can be automatically assigned by system 300 (FIG. 3) during the months of March through April and October; the forecasted weather condition of warm can be automatically assigned by system 300 (FIG. 3) during the months of May and September; and/or the forecasted weather condition of hot can be automatically assigned by system 300 (FIG. 3) during the months of June through August.

In many embodiments, method 400 can comprise an activity 405 of receiving at least one of (1) forecasted weather information for a location of a user device of a user, and/or (2) a weather condition selection of a set of weather conditions from the user device. For example, system 300 (FIG. 3) can receive forecasted weather for the determined location of the user device of the user, as described above, from any of a number of weather forecast services.

Alternatively or additionally, a user can select a particular weather condition selection from a set of weather conditions provided to the user on the user device, and system 300 (FIG. 3) can then receive the weather condition selection as selected by the user. In some embodiments, a user can select a first weather condition interface elements of a set of weather condition interface elements displayed on a user interface of the user device, and activity 405 can comprise receiving, from the user device, the weather condition selection of the first weather condition interface element of the set of weather condition interface elements.

In many embodiments, method 400 can further comprise an activity 410 of receiving at least one of (1) a default dress code of a set of dress codes for the user, and/or (2) a dress code selection of the set of dress codes from the user device. In some embodiments, a system 300 (FIG. 3) allows a user to select a default dress code. In some embodiments, activity 410 can comprise at least receiving, from the user device, the dress code selection of a first dress code interface element of a set of dress code interface elements. If a default dress code has been previously selected by the user, selection of a first dress code interface element can override the default dress code previously selected by the user. As noted above, the dress code can be selected from any of a variety of different dress codes, such as but not limited to a black tie dress code, a business formal dress code, a business casual dress code, a wedding dress code, a casual dress code, a "night on the town" dress code, a work travel dress code, and/or a rest & relaxation dress code.

In some embodiments, activity 410 also can comprise an optional activity of filtering at least one of (1) the items purchased by the user or (2) the catalogue of items available for purchase from the online retailer to create a set of filtered available items based on the dress code selection and/or the weather condition selection. For example, if a user has selected a casual dress code and/or a hot weather condition, system 300 (FIG. 3) can filter at least one of the items purchased by the user and/or the catalogue of available items for purchase from the online retailer to create a set of items suitable for a casual dress code and a hot weather condition. By filtering the items available for purchase from the online retailer, system 300 is able to operate faster because system 300 is not required to check each and every item available for purchase from the online retailer when generating a personalized outfit for the user.

In many embodiments, method 400 can further comprise an activity 415 of retrieving a purchase history for the user, the purchase history comprising any items purchased by the user from an online retailer. In some embodiments, the items purchased by the user are limited to items purchased from a single online retailer. In other embodiments, the items purchased by the user can comprise items purchased from multiple retailers.

In many embodiments, method 400 can further comprise an activity 420 of accessing an online catalogue of items available for purchase from the online retailer. In some embodiments, activity 420 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

In many embodiments, method 400 can further comprise an activity 425 of determining multiple layers for an outfit based on at least one of (1) the forecasted weather information or the weather condition selection, and/or (2) the default dress code or the dress code selection. In many embodiments, an outfit can include multiple different layers of clothing and/or accessories. For example, layers of an outfit can comprise one or more of a t-shirt layer, a casual shirt layer, a dress shirt layer, a vest layer, a sweater/shirt jacket layer, a blazers/suit jacket layer, a coats/jacket layer, a casual bottoms layer, a sweatpants layer, a swimwear layer, a dress pants/suit pants layer, a ties/pocket square layer, a hat/scarf layer, and/or a belt layer.

Based on at least one of (1) the forecasted weather information or the weather condition selection, and/or (2) the default dress code or the dress code selection, then, system 300 (FIG. 3) can determine what layers should be included in an outfit. For example, if the weather condition is determined to be hot and the dress code is determined to be black tie, system 300 (FIG. 3) can determine that the following layers should be included in an outfit displayed on a user device: a dress shirt layer, a blazer/suit jacket layer, a dress pants/suit pants layer, and a tie/pocket square layer. By way of another example, if the weather condition is determined to be warm and the dress code is determined to be business casual, system 300 (FIG. 3) can determine that the following layers should be included in an outfit displayed on a user device: a casual shirt layer or a dress shirt layer, a sweaters/shirt jackets layer or a blazer/suit jacket layer, a casual bottoms layer or a dress pants/suit pants layer, and a belt layer. By way of another example, if the weather condition is determined to be cool and the dress code is determined to be "night on the town" (or "night out"), system 300 (FIG. 3) can determine that the following layers should be included in an outfit displayed on a user device: (1) a t-shirt layer, a casual shirt layer, or a dress shirt layer, (2) a vest layer, a sweater/shirt jacket layer, or a blazers/suit jacket layer, (3) a coats/jacket layer, (4) a casual bottoms layer, (5) a sweatpants layer, and/or (6) a dress pants/suit pants layer. By way of another example, if the weather condition is determined to be cold and the dress code is determined to be rest & relaxation, system 300 (FIG. 3) can determine that the following layers should be included in an outfit displayed on a user device: a t-shirt layer or a casual shirt layer, a vest layer, a sweater/shirt jacket layer, a coats/jacket layer, a casual bottoms layer or a sweatpants layer, and/or a hat/scarf layer.

In many embodiments, method 400 can further comprise an activity 430 of determining one item for each layer of the multiple layers of the outfit. The one item for each layer of the multiple layers of the outfit can be from one of (1) the items purchased by the user from the online retailer, or (2) the online catalogue of items available for purchase from the online retailer. For example, if a casual shirt layer, a dress shirt layer, a sweaters/shirt jackets layer, a blazer/suit jacket layer, a casual bottoms layer, a dress pants/suit pants layer, and a belt layer have been determined to be included in an outfit displayed on a user device because the weather condition is determined to be warm and the dress code is determined to be business casual, system 300 (FIG. 3) can determine: a particular casual shirt from one of (1) the items purchased by the user from the online retailer, or (2) the online catalogue of items available for purchase from the online retailer: a particular a particular dress shirt from one of (1) the items purchased by the user from the online retailer, or (2) the online catalogue of items available for purchase from the online retailer, and so on. In some embodiments, activity 430 can comprise determining the one item for each layer of the multiple layers of the outfit from the set of filtered available items, described above.

In some optional embodiments, the item can be chosen from one of (1) the items purchased by the user from the online retailer, or (2) the online catalogue of items available for purchase from the online retailer depending on whether or not the user has selected "purchased items" or "all items" for creation of the outfit by system 300 (described in greater detail below). Thus, in many embodiment, method 400 can optionally comprise an activity of coordinating displaying, on the user interface of the user device, a purchased items interface element, an all items interface element, and a saved items element. For example, FIG. 6D illustrates a non-limiting example of an all items interface element 650, a purchased items interface element 650, and a saved items interface element 660. If, for example, a user selects all item interface element 650, the one item for each layer of the multiple layers of the outfit can be from either (1) the items purchased by the user from the online retailer, or (2) the online catalogue of items available for purchase from the online retailer. If, for example, system 300 (FIG. 3) receives, from the user device, a purchased items selection of purchased items interface element 655, the one item for each layer of the multiple layers of the outfit can be from only the items purchased by the user from the online retailer. If, for example, system 300 (FIG. 3) receives, from the user device, a saved items selection of saved items interface element 655, the one item for each layer of the multiple layers of the outfit can be from only the items previously saved by the user.

In many embodiments, the outfit can be based on (a) one or more item affinity scores for the user, and (b) one or more color rules configured to match the one item of each layer of the multiple layers with the one item of one or more other layers of the multiple layers. Affinity scores for a user can be determined by system 300 (FIG. 3) to allow system 300 to personalize outfits to the user that the user is more likely to prefer over other outfits. Affinity scores can be based on both item attributes and user preferences. For example, purchase history data, browsing data, favorited items data, and so on can be used to make inferences about unknown customer preferences. Item attributes can include both hard item attributes and soft item attributes. Hard item attributes can, for example, comprise objective attributes provided in product information from the vendor/suppliers, such as but not limited to: category, color, collar type, etc. Soft item attributes can, for example, comprise subjective attributes as determined by the online retailer such as but not limited to: brightness (bright, neutral, dark); temperature (hot, warm, cool, cold); dress code (casual, business casual, business formal, travel, night on the town, wedding, black tie); pattern (solid, checks, conversational, dot, geo, gingham, plaid, striped, ikat, large floral, small floral); and so on.

In some embodiments, method 400 can comprise an activity of determining the one or more item affinity scores for the user by: (1) mapping user item preferences into an attribute space using weighted input data to determine user attribute preferences for the user, and (2) mapping the user attribute preferences for the user to determine an item score for each item of at least one of (a) the items purchased by the user from the online retailer, and (b) the catalogue of items available for sale from the online retailer.

In many embodiments, affinity score(s) for a user can be determined using matrices. By way of a non-limiting example, assume there are four items and four attribute sources as follows:

|         | hot | cold | casual | formal |
|---------|-----|------|--------|--------|
| t-shirt | 1   | 0    | 1      | 0      |
| shorts  | 1   | 0    | 1      | 0      |
| blazer  | 1   | 1    | 0      | 1      |
| sweater | 0   | 1    | 0      | 1      |

In this non-limiting example, a t-shirt has been labeled as appropriate (1) for hot weather conditions and casual dress codes. The t-shirt also has been labeled as inappropriate (0) for cold weather conditions and formal dress codes. Shorts, a blazer, and a sweater have similarly been labeled as appropriate or inappropriate for certain weather conditions and dress codes. In some embodiments, the appropriate (1) and inappropriate (0) can comprise an average across all items in that layer.

Continuing with this example, in some embodiments, data can be weighted. For example, browsing an item can be scored as 1, adding an item to a wishlist can be scored as 2, adding the item to the cart can be scored as 3, and purchasing the item can be scored as 4:

|             | score |
|-------------|-------|
| browse      | 1     |
| wishlist    | 2     |
| add-to-cart | 3     |
| purchase    | 4     |

If a customer has purchased a t-shirt, but not browsed, added to the wishlist, added to the cart, or purchased shorts, a blazer, or a sweater, the scores as weight can be listed as:

|         | score |
|---------|-------|
| t-shirt | 4     |
| shorts  | 0     |
| blazer  | 0     |
| sweater | 0     |

Affinity scores can then, in some embodiments, be determined based upon matrix multiplication. Continuing with the example above:

attribute × item scores

|  | t-shirt | shorts | blazer | sweater |
|---|---|---|---|---|
| hot | 1 | 0 | 1 | 0 |
| cold | 1 | 0 | 1 | 0 |
| casual | 1 | 1 | 0 | 1 |
| formal | 0 | 1 | 0 | 1 | multiplied by item × (expl) scores

|  | score |
|---|---|
| t-shirt | 4 |
| shorts | 0 |
| blazer | 0 |
| sweater | 0 | equals

| attribute × (expl) |
|---|
| 4 |
| 0 |
| 4 |
| 0 |

In this example, then, buying a t-shirt in item space is the same thing as "buying" hot-casual in attribute space.

Continuing with this example:

item × attribute (inferred) scores

|  | hot | cold | casual | formal |
|---|---|---|---|---|
| t-shirt | 1 | 0 | 1 | 0 |
| shorts | 1 | 0 | 1 | 0 |
| blazer | 1 | 1 | 0 | 1 |
| sweater | 0 | 1 | 0 | 1 | multiplied by

| attribute × (expl) |
|---|
| 4 |
| 0 |
| 4 |
| 0 | equals

| item × |
|---|
| 8 |
| 4 |
| 0 |

From the above example, then, the affinity scores indicated that if a user likes the t-shirt, the user will definitely like the shorts (hot/casual) and might like the blazer (hot or cold/formal).

As noted above, the outfit also can be based on (b) one or more color rules configured to match the one item of each layer of the multiple layers with the one item of one or more other layers of the multiple layers. The one or more color rules can comprise, for each layer, whether a certain color and/or pattern matches or does not match other colors and/or patterns of other layers. For example, the one or more color rules can indicate that, for tops and bottoms, a black t-shirt matches (1): black, blue, brown, grey, khaki, multicolored, olive, and white casual bottoms; black, blue, brown, grey, khaki, multicolored, olive, and white pants; black, blue, brown, grey, khaki, multicolored, olive, and white sweatpants; and black, blue, brown, grey, khaki, multicolored, olive, and white swimwear. Continuing with this example, the one or more color rules can indicate that, for tops and bottoms, a black t-shirt does not match (0): green, natural, orange, pink, purple, red, silver, and yellow casual bottoms; green, natural, orange, pink, purple, red, silver, and yellow sweatpants; and green, natural, orange, pink, purple, red, silver, and yellow swimwear.

The one or more rules can comprise other matching or non-matching rules for other colors of other items and layers. For example, beyond the matching rules of tops and bottoms, the one or more color rules can comprising matching rules for tops and sweaters, tops and blazers, tops and coats, tops and accessories, bottoms and sweaters, bottoms and coats, bottoms and accessories, sweaters and blazers, sweaters and coats, sweaters and accessories, blazers and coats, blazers and accessories, coats and accessories, and accessories and other accessories.

In many embodiments, method 400 can further comprise an activity 435 of coordinating displaying the first outfit on a user interface of the user device. If the user has downloaded the mobile application, activity 435 can comprise coordinating displaying the first outfit on a user interface of the mobile application operating on the user device. In some embodiments, activity 435 can comprise an activity of generating instructions for displaying the first outfit on the user device.

In some optional embodiments, a user can refresh view multiple different outfits based on the activities and rules described above. More particularly, if a user likes an item of a layer of an outfit, but not other layers of the outfit, the user can lock the item of the layer, and then refresh the outfit to view other items of other layers that match the item locked by the user. For example, method 400 can optionally comprise an activity of coordinating displaying, on the user interface of the user device, a lock item interface element on the one item of each layer of the multiple layers of the first outfit. FIG. 6E shows a non-limiting example a user interface 600 displaying a lock item interface element 665. Method 400 also can comprise an optional activity of coordinating displaying, on the user interface of the user device, a refresh outfit interface element. FIG. 6E shows a non-limiting example of user interface 600 displaying a refresh outfit interface element 680.

In many embodiments, method 400 can optionally comprise an activity of receiving, from the user device, a lock item selection of the lock item interface element of a first item of a first layer of the multiple layers of the first outfit. For example, in FIG. 6E, lock item interface element 665 has been locked on a first item 681 of a shirt layer of an outfit. After the lock item selection has been received, method 400 can optionally comprise an activity of receiving, from the user device, a refresh outfit selection of the refresh outfit interface element. For example, in FIG. 6E, a user can select refresh outfit interface element 680.

In response to receiving the refresh outfit selection from the user device after receiving the lock item selection of the lock item interface element of the first item of the first layer of the multiple layers of the first outfit, method 400 can optionally comprise an activity of determining a different outfit for the user. The different outfit for the user can comprise (1) the first item of the first layer of the multiple layers as locked by the user, and (2) one or more remaining layers of the multiple layers. Each layer of the one or more remaining layers of the multiple layers can comprise one different item from one of (a) the items purchased by the user from the online retailer, or (b) the catalogue of items available for sale from the online retailer. The one different item of the one or more remaining layers for the different outfit is different from the one item of the one or more remaining layers of the original outfit displayed to the user. Like other embodiments, the different outfit can be based on the one or more item affinity scores for the user and the one or more color rules configured to match the first item of the first layer as locked by the user with the one different item of the one or more remaining layers of the multiple layers of the second outfit. Method 400 can then optionally comprise an activity of coordinating displaying the new outfit on the user interface of the user device.

FIG. 5 illustrates a block diagram of a portion of system 300 comprising outfit system 310, web server 320, and display system 360, according to the embodiment shown in FIG. 3. Each of outfit system 310, web server 320, and display system 360 is merely exemplary and not limited to the embodiments presented herein. Each of outfit system 310, web server 320, and display system 360 can be employed in many different embodiments or examples not specifically depicted or described herein. In some embodiments, certain elements or modules of can perform various procedures, processes, and/or acts. In other embodiments, the procedures, processes, and/or acts can be performed by other suitable elements or modules.

In many embodiments, outfit system 310 can comprise non-transitory memory storage module 512. Memory storage module 512 can be referred to as outfit module 512. In many embodiments, outfit module 512 can store computing instructions configured to run on one or more processing modules and perform one or more acts of method 400 (FIG. 4) (e.g., activity 405 of receiving at least one of (1) forecasted weather information for a location of a user device of a user, or (2) a weather condition selection of a set of weather conditions from the user device (FIG. 4), activity 410 of receiving at least one of (1) a default dress code of a set of dress codes for the user, or (2) a dress code selection of the set of dress codes from the user device (FIG. 4), activity 415 of retrieving a purchase history for the user, the purchase history comprising items purchased by the user from an online retailer (FIG. 4), activity 420 of accessing an online catalogue of items available for purchase from the online retailer (FIG. 4), activity 425 of determining multiple layers for a first outfit based on at least one of (1) the forecasted weather information or the weather condition selection, and (2) the default dress code or the dress code selection (FIG. 4), activity 430 of determining one item for each layer of the multiple layers of the first outfit (FIG. 4), an activity of transmitting instructions for downloading a mobile application for the online retailer onto the user device, an activity of filtering at least one of (1) the items purchased by the user or (2) the catalogue of items available for purchase from the online retailer to create a set of filtered available items based on the dress code selection and the weather condition selection, an activity of receiving a purchased items selection of the purchased items interface element, an activity of receiving, from the user device, a lock item selection of the lock item interface element of a first item of a first layer of the multiple layers of the first outfit, an activity of receiving, from the user device, a refresh outfit selection of the refresh outfit interface element, an activity of, in response to receiving the refresh outfit selection from the user device after receiving the lock item selection of the lock item interface element of the first item of the first layer of the multiple layers of the first outfit, determining a second outfit for the user, an activity of mapping user item preferences into an attribute space using weighted input data to determine user attribute preferences for the user, and an activity of mapping the user attribute preferences for the user to determine an item score for each item of at least one of (1) the items purchased by the user from the online retailer, and (2) the catalogue of items available for sale from the online retailer).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 430 of coordinating displaying the first outfit on a user interface of the user device (FIG. 4), an activity of coordinating displaying the first outfit on the user interface of the user device comprises coordinating displaying the first outfit on the user interface of the mobile application operating on the user device, an activity of coordinating displaying a set of dress code interface elements, an activity of coordinating displaying a set of weather condition interface elements, an activity of coordinating displaying a purchased items interface element, an all items interface element, and a saved items element, an activity of coordinating displaying a lock item interface element on the one item of each layer of the multiple layers of the first outfit, and an activity of coordinating displaying, on the user interface of the user device, a refresh outfit interface element, an activity of coordinating displaying the second outfit on the user interface of the user device).

Turning ahead in the drawings to FIG. 6A, which illustrates a diagram of an interface 600. In many embodiments, interface 600 can be displayed on a screen of user computer 340 (FIG. 3), such as but not limited to a user mobile device. In some embodiments, interface 600 is displayed on an interface of a mobile application of an online retailer operating on user computer 340. In many embodiments, interface 600 can display a set of dress code interface elements 605, an explore interface element 610, a shop interface element 615, a cart interface element 620, a closet interface element 625, and an account interface element 630. In some embodiments, interface 600 can display different categories of items available for purchase from the online retailer, such as but not limited to new items, bottoms, tops, tailored, and so on.

Figure 6B:
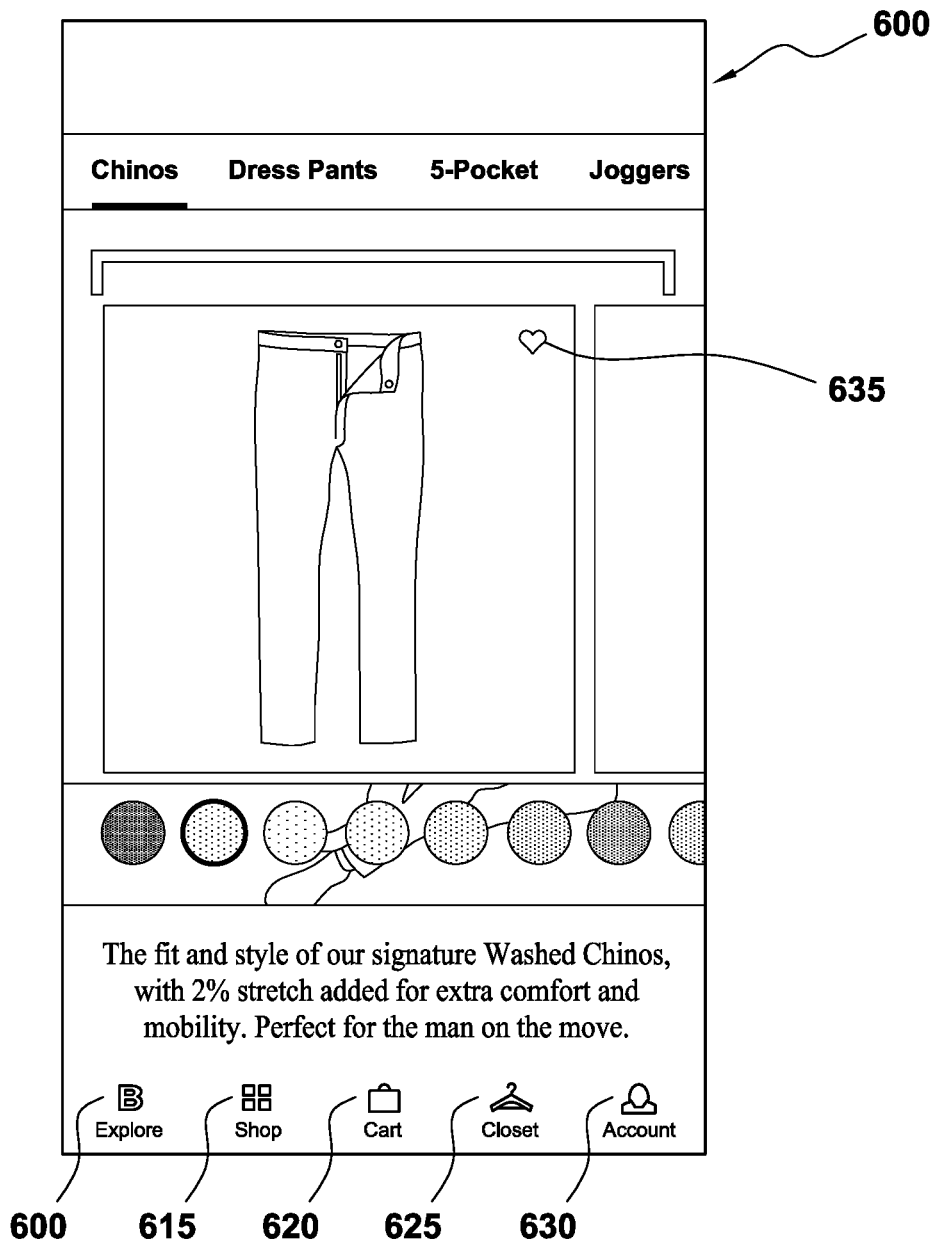

Turning ahead in the drawings to FIG. 6B, which illustrates another diagram of interface 600. In many embodiments, interface 600 can display one or more items available for purchase from the online retailer. Each item displayed on interface 600 can comprise a save interface element 635. If selected by the user, save interface element 635 saves the item for future reference or use in generating an outfit.

Figure 6C:
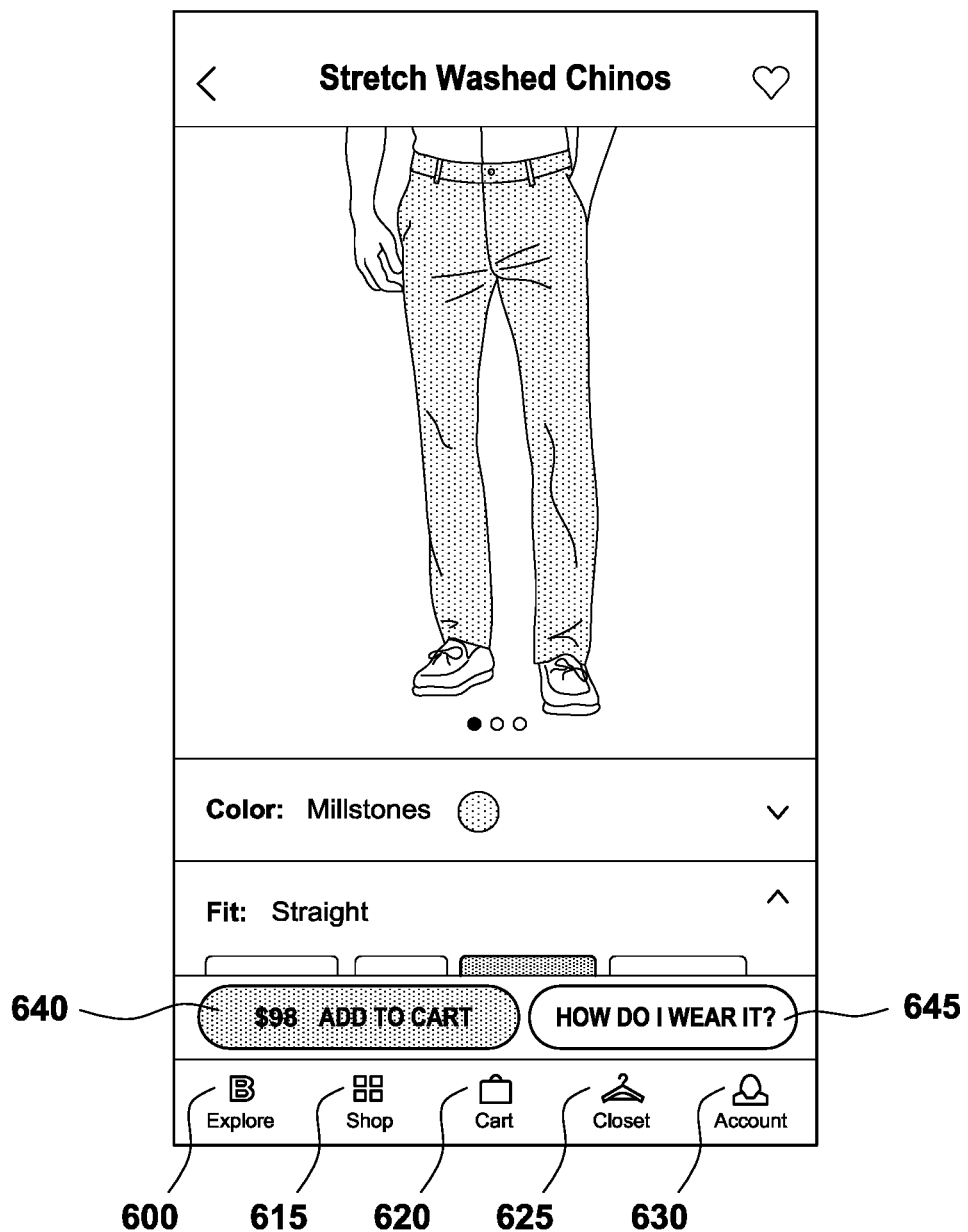
Figure 6D:
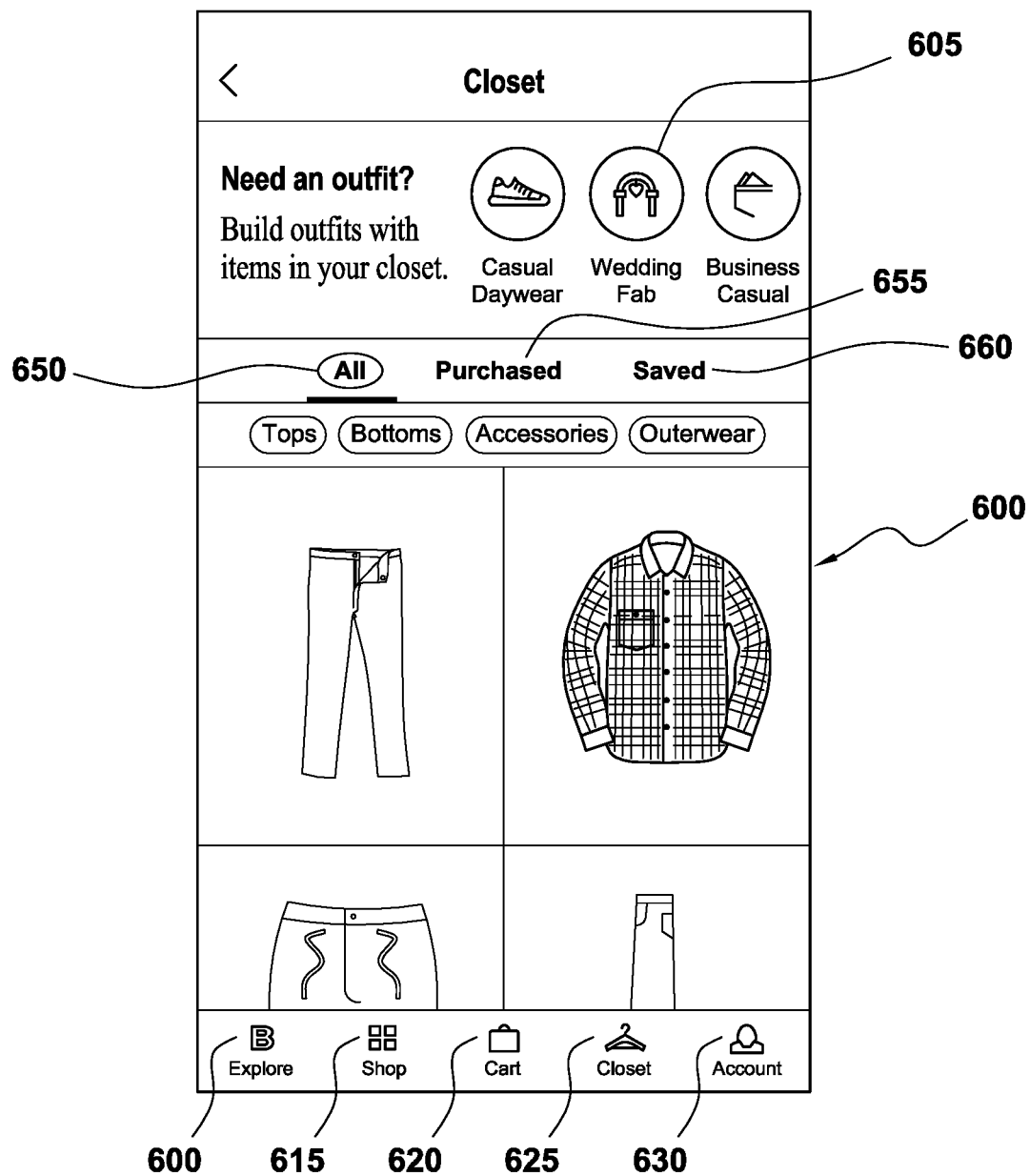
Figure 6E:
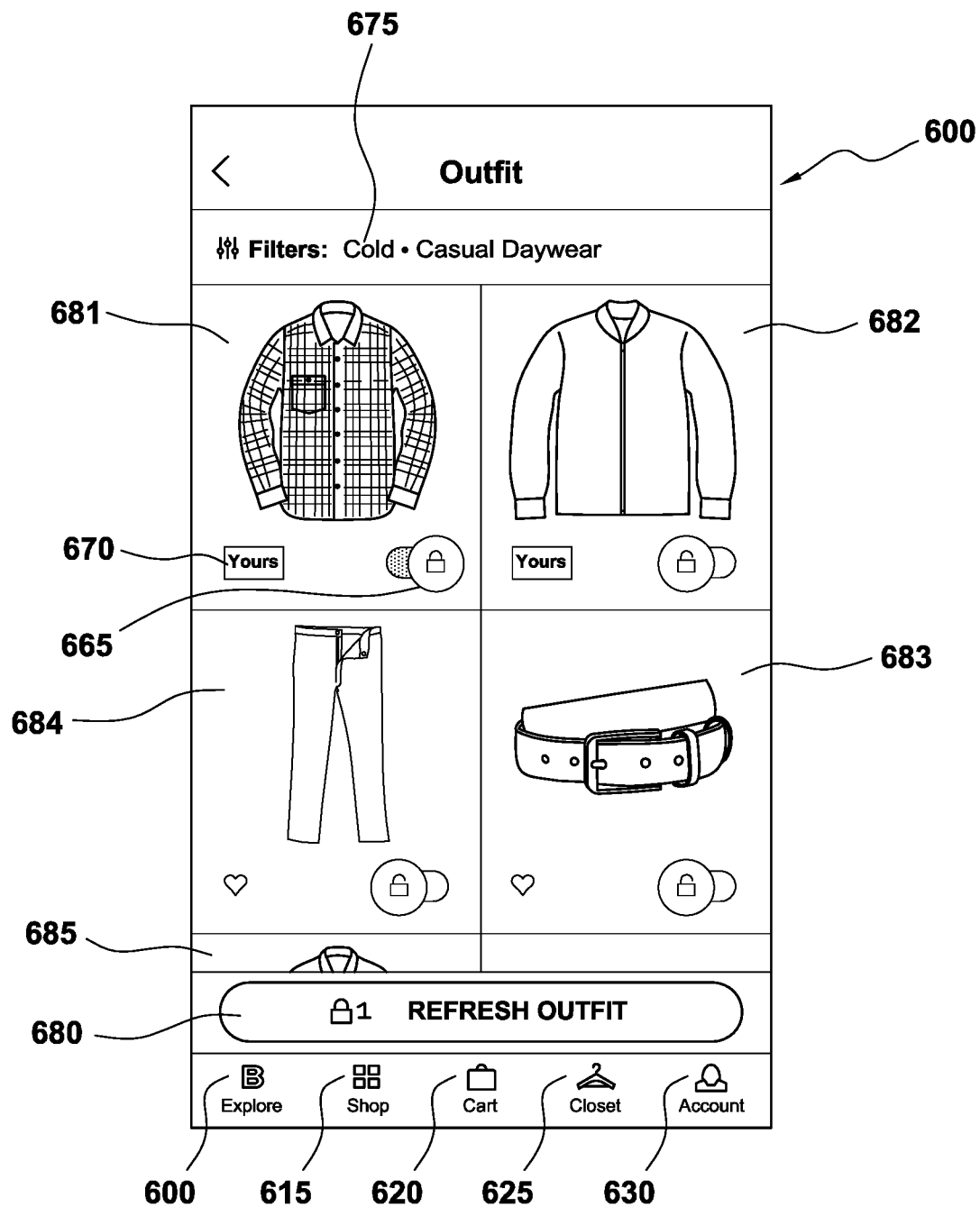

Turning ahead in the drawings to FIG. 6C, which illustrates another diagram of interface 600. In many embodiments, interface 600 can display, with one or more items displayed on interface 600 an "add to cart" interface element 640 and/or a "how do I wear it?" interface element 645. In other embodiments, interface elements described herein can comprise different words, icons, and so on, and perform the same or similar functions as described herein. Selection of "add to cart" interface element 640 by the user adds the item displayed on interface 600 to the electronic shopping cart of the user. Selection of "how do I wear it?" interface element 645 by the user prompts system 300 (FIG. 3) to generate an outfit that includes the item in one layer of multiple layers, and other items in other layers of the multiple layers, as described in greater detail above. In some embodiments, if a user selects "how do I wear it?" interface element 645, the item displayed on interface 600 is automatically locked into the outfit.

In some embodiments, if a user selects "how do I wear it?" interface element 645, the dress code and weather condition for the outfit generated by system 300 (FIG. 3) are automatically defaulted to a dress code and/or weather condition associated with the item. For example, if the item displayed on interface 600 is a swimsuit, and if the user selects "how do I wear it?" interface element 645, the weather condition can default to "hot," and the dress code can default to "rest & relaxation." In such an example, the outfit generated by system 300 (FIG. 3) will be based on the "hot" weather condition and/or the "rest & relaxation" dress code.

Turning ahead in the drawings to FIG. 6D, which illustrates another diagram of interface 600. In many embodiments, interface 600 can display an outfit generation according to the various activities and rules described elsewhere in this document. As noted above, interface 600 can, in some embodiments, display all item interface element 650, purchased items interface element 655, and/or saved items interface element 660. Selection of all item interface element 650, purchased items interface element 655, or saved items interface element 660 can filter the items used in the outfit generated by system 300 (FIG. 3), as described above.

Turning ahead in the drawings to FIG. 6E, which illustrates another diagram of interface 600. In many embodiments, interface 600 can display multiple layers of an outfit determined by system 300. For example, interface 600 can display first item 681 of a first layer, a second item 682 of a second layer, a third item 683 of a third layer, a fourth item 684 of a fourth layer, and a fifth item 685 of a fifth layer. As described above, interface 600 also can display lock item interface element 665 for each item. If, for example, lock item interface element 665 for first item 681 of the first layer is selected before the user selected refresh outfit interface element 680, then when interface 600 displays a new outfit, the first item of the first layer will remain part of the new outfit, while the second, third, fourth, and fifth layers will each include different items.

Interface 600 also can display filters that allow a user to select one of a set of weather condition interface elements 675 and/or one of a set of dress code interface elements. Interface 600 also can display an "owned item" element 670 in a layer that indicates a user already owns the item display in that layer. For example, in FIG. 6E, owned item element 670 is shown next to first item 681 and second item 682, indicating that the user has previously purchased first item 681 and second item 682 from the online retailer.

Although systems and methods for displaying a personalized outfit have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
      receiving at least one of:
         (1) forecasted weather information for a location of a user device of a user; or
         (2) a weather condition selection of a set of weather conditions from the user device of the user;
      receiving at least one of:
         (1) a default dress code of a set of dress codes for the user; or
         (2) a dress code selection of the set of dress codes from the user device of the user;
      retrieving a purchase history for the user, the purchase history for the user comprising items purchased by the user from an online retailer;
      accessing an online catalogue of items available for purchase from the online retailer;
      determining multiple layers for a first outfit based on at least one of:
         (1) the forecasted weather information or the weather condition selection; or
         (2) the default dress code or the dress code selection;
      determining at least one respective item for each respective layer of the multiple layers of the first outfit from one of:
         (1) the items purchased by the user from the online retailer; or
         (2) the online catalogue of items available for purchase from the online retailer, wherein:
            the first outfit is based on:
               (a) one or more item affinity scores for the user; and
               (b) one or more color rules configured to match the at least one respective item of each respective layer of the multiple layers with the at least one respective item of one or more other respective layers of the multiple layers;

coordinating displaying, on a user interface of the user device, the first outfit; and
coordinating displaying, on the user interface of the user device, a lock item interface element on the at least one respective item of each respective layer of the multiple layers of the first outfit, the lock item interface element configured to, when selected, lock the at least one respective item of each respective layer of the multiple layers of the first outfit such that the at least one respective item of each respective layer remains in the first outfit after a refresh of the first outfit, wherein:
the one or more item affinity scores for the user are determined by:
mapping user item preferences into a matrix comprising weighted input data to determine user attribute preferences for the user; and
mapping the user attribute preferences for the user to determine a respective item score for each respective item of at least one of:
(1) the items purchased by the user from the online retailer; and
(2) the online catalogue of items available for purchase from the online retailer.

2. The system of claim 1, wherein:
the one or more non-transitory computer-readable media storing the computing instructions are further configured to run on the one or more processors and perform:
transmitting instructions for downloading a mobile application for the online retailer onto the user device; and
coordinating displaying the first outfit on the user interface of the user device comprises:
coordinating displaying the first outfit in the mobile application on the user interface of the user device.

3. The system of claim 1, wherein:
the one or more non-transitory computer-readable media storing the computing instructions are further configured to run on the one or more processors and perform:
coordinating displaying, on the user interface of the user device, a set of dress code interface elements, each dress code interface element of the set of dress code interface elements associated with a different dress code of the set of dress codes; and
coordinating displaying, on the user interface of the user device, a set of weather condition interface elements, each weather condition interface element of the set of weather condition interface elements associated with a different weather condition of the set of weather conditions;
receiving at least one of (1) the default dress code of the set of dress codes for the user or (2) the dress code selection of the set of dress codes comprises:
receiving, from the user device, the dress code selection of a first dress code interface element of the set of dress code interface elements;
receiving at least one of (1) the forecasted weather information for the location of the user device of the user or (2) the weather condition selection of the set of weather conditions from the user device comprises:
receiving, from the user device, the weather condition selection of a first weather condition interface element of the set of weather condition interface elements;
the one or more non-transitory computer-readable media storing the computing instructions are further configured to run on the one or more processors and perform:
filtering at least one of (1) the items purchased by the user or (2) the online catalogue of items available for purchase from the online retailer to create a set of filtered available items based on the dress code selection and the weather condition selection;
determining the at least one respective item for each respective layer of the multiple layers of the first outfit comprises:
determining the at least one respective item for each respective layer of the multiple layers of the first outfit from the set of filtered available items; and
the first outfit is based on:
(a) the one or more item affinity scores for the user, as determined; and
(b) the one or more color rules configured to match the at least one respective item of each respective layer of the multiple layers with the at least one respective item of the one or more other respective layers of the multiple layers.

4. The system of claim 1, wherein:
the one or more non-transitory computer-readable media storing the computing instructions are further configured to run on the one or more processors and perform:
coordinating displaying, on the user interface of the user device, a purchased items interface element, an all items interface element, and a saved items element; and
receiving, from the user device, a purchased items selection of the purchased items interface element;
determining the at least one respective item for each respective layer of the multiple layers of the first outfit comprises:
determining the at least one respective item for each respective layer of the multiple layers of the first outfit from the items purchased by the user from the online retailer; and
the first outfit is based on:
(a) the one or more item affinity scores for the user; and
(b) the one or more color rules configured to match the at least one respective item of each respective layer of the multiple layers with the at least one respective item of the one or more other respective layers of the multiple layers.

5. The system of claim 1, wherein the one or more non-transitory computer-readable media storing the computing instructions are further configured to run on the one or more processors and perform:
coordinating displaying, on the user interface of the user device, a refresh outfit interface element;
receiving, from the user device, a lock item selection of the lock item interface element of a first item of a first layer of the multiple layers of the first outfit;
receiving, from the user device, a refresh outfit selection of the refresh outfit interface element;
in response to receiving the refresh outfit selection from the user device and after receiving the lock item selection of the lock item interface element of the first item of the first layer of the multiple layers of the first outfit, determining a second outfit for the user comprising (1) the first item of the first layer of the multiple layers and (2) one or more remaining layers of the multiple layers, each respective layer of the one or more remaining layers of the multiple layers comprising one different item from one of (a) the items purchased by the user from the online retailer or (b) the online catalogue of items available for sale from the online retailer, wherein:
the one different item of the one or more remaining layers for the second outfit is different from the at least one respective item of the one or more remaining layers of the first outfit, and the second outfit is based on:
the one or more item affinity scores for the user; and
the one or more color rules configured to match the first item of the first layer with the one different item of the one or more remaining layers of the multiple layers of the second outfit; and
coordinating displaying the second outfit on the user interface of the user device.

6. The system of claim 1, wherein one or more user interactions with the user interface comprises at least one of:
a browse interaction;
an add to wishlist interaction;
an add-to-cart interaction; or
a purchase interaction.

7. The system of claim 6 wherein:
the purchase interaction is weighted more than the add-to-cart interaction;
the add-to-cart interaction is weighted more than the add to wishlist interaction; and
the add to wishlist interaction is weighted more than the browse interaction.

8. The system of claim 1, wherein determining the respective item score comprises using matrix multiplication.

9. The system of claim 1, wherein the forecasted weather information for the location of the user device of the user is automatically generated based on a current season.

10. The system of claim 1, wherein the set of dress codes comprises: a black tie dress code; a business formal dress code; a business casual dress code; a wedding dress code; a casual dress code; a work travel dress code; and a relaxation dress code.

11. A method being implemented via execution of computing instructions configured to run at one or more processors and configured to be stored at non-transitory computer-readable media, the method comprising:
receiving at least one of:
(1) forecasted weather information for a location of a user device of a user; or
(2) a weather condition selection of a set of weather conditions from the user device of the user;
receiving at least one of:
(1) a default dress code of a set of dress codes for the user; or
(2) a dress code selection of the set of dress codes from the user device of the user;
retrieving a purchase history for the user, the purchase history for the user comprising items purchased by the user from an online retailer;
accessing an online catalogue of items available for purchase from the online retailer;
determining multiple layers for a first outfit based on at least one of:
(1) the forecasted weather information or the weather condition selection; or
(2) the default dress code or the dress code selection;
determining at least one respective item for each respective layer of the multiple layers of the first outfit from one of:
(1) the items purchased by the user from the online retailer; or
(2) the online catalogue of items available for purchase from the online retailer, wherein:
the first outfit is based on:
(a) one or more item affinity scores for the user; and
(b) one or more color rules configured to match the at least one respective item of each respective layer of the multiple layers with the at least one respective item of one or more other respective layers of the multiple layers;
coordinating displaying, on a user interface of the user device, the first outfit; and
coordinating displaying, on the user interface of the user device, a lock item interface element on the at least one respective item of each respective layer of the multiple layers of the first outfit, the lock item interface element configured to, when selected, lock the at least one respective item of each respective layer of the multiple layers of the first outfit such that the at least one respective item of each respective layer remains in the first outfit after a refresh of the first outfit, wherein:
the one or more item affinity scores for the user are determined by:
mapping user item preferences into a matrix comprising weighted input data to determine user attribute preferences for the user; and
mapping the user attribute preferences for the user to determine a respective item score for each respective item of at least one of:
(1) the items purchased by the user from the online retailer; and
(2) the online catalogue of items available for purchase from the online retailer.

12. The method of claim 11, wherein:
the method further comprises:
transmitting instructions for downloading a mobile application for the online retailer onto the user device; and
coordinating displaying the first outfit on the user interface of the user device comprises:
coordinating displaying the first outfit in the mobile application on the user interface of the user device.

13. The method of claim 11, wherein:
the method further comprises:
coordinating displaying, on the user interface of the user device, a set of dress code interface elements, each dress code interface element of the set of dress code interface elements associated with a different dress code of the set of dress codes; and
coordinating displaying, on the user interface of the user device, a set of weather condition interface elements, each weather condition interface element of the set of weather condition interface elements associated with a different weather condition of the set of weather conditions;
receiving at least one of (1) the default dress code of the set of dress codes for the user or (2) the dress code selection of the set of dress codes comprises:
receiving, from the user device, the dress code selection of a first dress code interface element of the set of dress code interface elements;
receiving at least one of (1) the forecasted weather information for the location of the user device of the user or (2) the weather condition selection of the set of weather conditions from the user device comprises:

receiving, from the user device, the weather condition selection of a first weather condition interface element of the set of weather condition interface elements;

the method further comprises filtering at least one of: (1) the items purchased by the user or (2) the online catalogue of items available for purchase from the online retailer to create a set of filtered available items based on the dress code selection and the weather condition selection;

determining the at least one respective item for each respective layer of the multiple layers of the first outfit comprises:

determining the at least one respective item for each respective layer of the multiple layers of the first outfit from the set of filtered available items; and the first outfit is based on:
(a) the one or more item affinity scores for the user, as determined; and
(b) the one or more color rules configured to match the at least one respective item of each respective layer of the multiple layers with the at least one respective item of the one or more other respective layers of the multiple layers.

14. The method of claim 11, wherein:

the method further comprises:

coordinating displaying, on the user interface of the user device, a purchased items interface element, an all items interface element, and a saved items element; and receiving, from the user device, a purchased items selection of the purchased items interface element;

determining the at least one respective item for each respective layer of the multiple layers of the first outfit comprises:

determining the at least one respective item for each respective layer of the multiple layers of the first outfit from the items purchased by the user from the online retailer; and the first outfit is based on:
(a) the one or more item affinity scores for the user; and
(b) the one or more color rules configured to match the at least one respective item of each respective layer of the multiple layers with the at least one respective item of the one or more other respective layers of the multiple layers.

15. The method of claim 11, wherein the method further comprises:

coordinating displaying, on the user interface of the user device, a refresh outfit interface element;

receiving, from the user device, a lock item selection of the lock item interface element of a first item of a first layer of the multiple layers of the first outfit;

receiving, from the user device, a refresh outfit selection of the refresh outfit interface element;

in response to receiving the refresh outfit selection from the user device and after receiving the lock item selection of the lock item interface element of the first item of the first layer of the multiple layers of the first outfit, determining a second outfit for the user comprising (1) the first item of the first layer of the multiple layers and (2) one or more remaining layers of the multiple layers, each respective layer of the one or more remaining layers of the multiple layers comprising one different item from one of (a) the items purchased by the user from the online retailer or (b) the online catalogue of items available for sale from the online retailer, wherein:

the one different item of the one or more remaining layers for the second outfit is different from the at least one respective item of the one or more remaining layers of the first outfit, and the second outfit is based on:

the one or more item affinity scores for the user; and the one or more color rules configured to match the first item of the first layer with the one different item of the one or more remaining layers of the multiple layers of the second outfit; and coordinating displaying the second outfit on the user interface of the user device.

16. The method of claim 11, wherein one or more user interactions with the user interface comprises at least one of:
a browse interaction;
an add to wishlist interaction;
an add-to-cart interaction; or
a purchase interaction.

17. The method of claim 16, wherein:
the purchase interaction is weighted more than the add-to-cart interaction;
the add-to-cart interaction is weighted more than the add to wishlist interaction; and
the add to wishlist interaction is weighted more than the browse interaction.

18. The method of claim 11, wherein determining the respective item score comprises using matrix multiplication.

19. The method of claim 11, wherein the forecasted weather information for the location of the user device of the user is automatically generated based on a current season.

20. The method of claim 11, wherein the set of dress codes comprises: a black tie dress code; a business formal dress code; a business casual dress code; a wedding dress code; a casual dress code; a work travel dress code; and a relaxation dress code.

* * * * *